Feb. 7, 1956     A. B. JONES, JR     2,733,967
MULTISTAGE ANTIFRICTION THRUST BEARING
Filed May 6, 1954
FIG. 1.     FIG. 2.     FIG. 3.
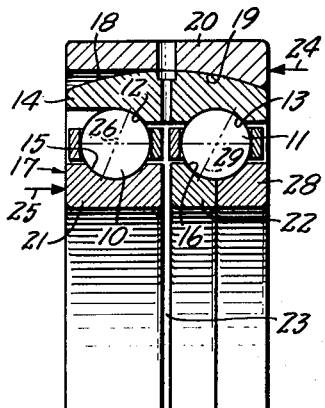
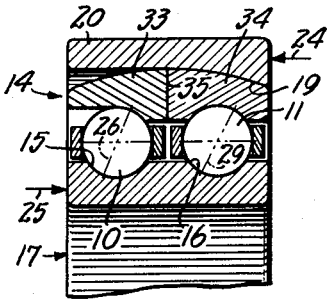
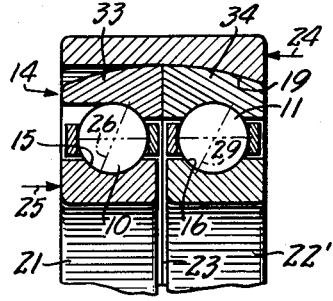
FIG. 5.     FIG. 6.
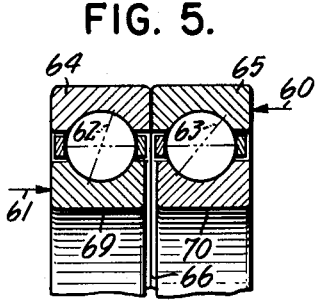
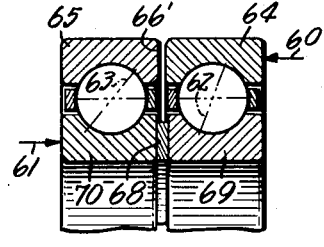
FIG. 7.
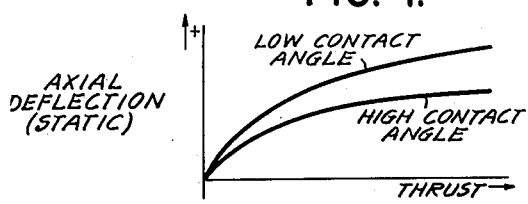
AXIAL DEFLECTION (STATIC)
FIG. 4.
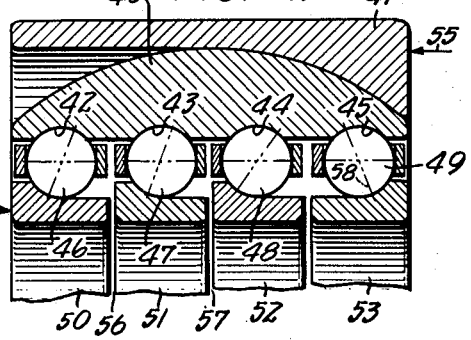
FIG. 8.
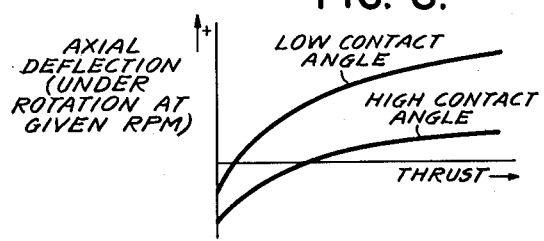
AXIAL DEFLECTION (UNDER ROTATION AT GIVEN RPM)
FIG. 10.
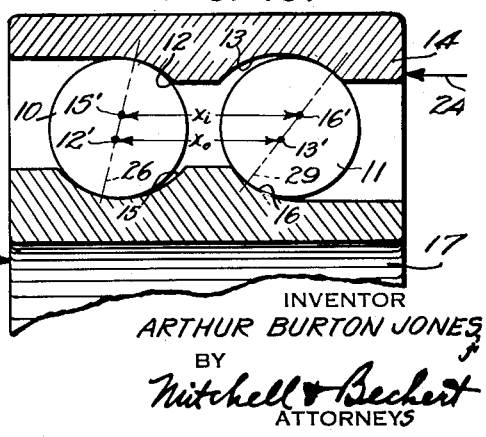
FIG. 9.
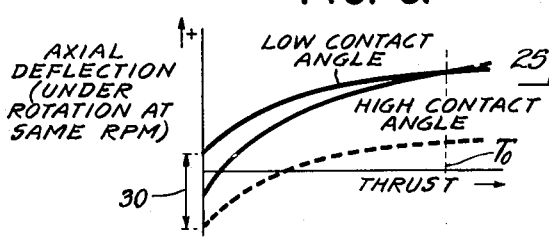
AXIAL DEFLECTION (UNDER ROTATION AT SAME RPM)
INVENTOR
ARTHUR BURTON JONES
BY
Mitchell & Bechert
ATTORNEYS United States Patent Office 2,733,967
Patented Feb. 7, 1956

2,733,967

MULTISTAGE ANTIFRICTION THRUST BEARING

Arthur Burton Jones, Jr., Newington, Conn., assignor to The Fafnir Bearing Company, New Britain, Conn., a corporation of Connecticut Application May 6, 1954, Serial No. 428,047

22 Claims. (Cl. 308—174)

My invention relates to multiple-row thrust bearings comprising inner and outer rings with antifriction elements therebetween, and this application is a continuation-in-part of my copending application, Serial No. 354,477, filed May 12, 1953, and now abandoned.

It is an object of the invention to provide improved bearing means of the character indicated.

It is another object to provide an improved multiple-row thrust-bearing arrangement, whereby, inherent with progressive thrust loading in predominantly a single direction, no single row will become overloaded until all rows have uniformly sustained the load or have sustained the load in the desired proportional relationship, as, for example, substantially uniform loading per antifriction element, or, also for example, a preassigned proportional load sharing per row.

It is a further object to provide a multiple-row unidirectional-thrust bearing in which one row may, under low-thrust conditions, provide precision radial support, and whereby, with increasing thrust, a plurality of rows including said one row may eventually share the thrust load in a given relation of load per row and with said one row ultimately assuming a substantial thrust load.

It is a specific object to provide a multiple-row thrust bearing meeting the above objects and at the same time serving a self-aligning function and compensating for ring deformation occasioned by the nature of the self-aligning seat engagement.

It is another specific object to provide means whereby standard duplex bearings may be positioned with respect to each other in order to obtain a desired progressive load sharing, as far as both the thrust and radial loads are concerned, and for thrust in essentially a single direction.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a longitudinal sectional view of a self-aligning duplex bearing incorporating features of the invention;

Figs. 2, 3, and 4 are fragmentary sectional views of modifications of the bearing of Fig. 1;

Figs. 5 and 6 are fragmentary sectional views representing embodiments of the invention without the self-aligning feature;

Figs. 7, 8, and 9 are graphical illustrations of functioning according to the invention; and Fig. 10 is a fragmentary sectional view of a further modification.

Briefly stated, the invention contemplates multiple-row thrust-bearing means in which the race walls for each row or bearing section are inclined to sustain a combined axial and radial load, predominantly unidirectional as far as the axial component is concerned; the useful wall inclination for each of the multiple rows will be in the same direction, so that contact angles for the respective rows may be similarly, although not necessarily equally, inclined. It will be understood that wall inclination (determining contact angle) may be a function of the radial clearance and of relative race curvature; by "radial clearance" is meant the maximum diameter of the toric outer race, minus the minimum diameter of the toric inner race, minus twice the ball diameter; by "race curvature" is meant the ratio of the radius of the race contour to the diameter of the ball. Various means are provided for assuring given or desired axial spacing between the races of the outer-ring means with respect to spacing of the races of the inner-ring means, to an extent permitting a predetermined excess of axial-deflection of one of the bearing sections over the axial-deflection of the other bearing section for a given unidirectional thrust load on the bearing.

In some cases to be described, the contact angle for one bearing section is initially (i. e. no-load conditions) relatively low as compared with that of the other bearing section. The arrangement is such that, with increasing load, ring deformation increases the contact angle for the row which initially had the relatively low contact angle; this angle may tend to approach a predetermined higher contact angle, as for example, that for one or more of the other rows, until, at the desired maximum total thrust, all rows sustain the desired sharing of the overall unidirectional thrust load. In other cases to be described, one of the bearing sections is characterized by an initial relatively high contact angle, so that with race deformations (as, for example, occasioned by the radial compression of an outer race ring due to wedging pressure from a self-aligning seat) this angle is reduced, and the same desired ultimate sharing of the thrust load is achieved. The means for determining the relative axial positioning of races as indicated above may involve precision machining of the plurality of raceways in a single, solid race ring (e. g. solid inner or solid outer ring, or both rings solid); alternatively, separate rings may be employed, either with given axial gaps therebetween to allow for the desired difference in axial-deflection of the rows, or with given axial interferences (as determined by shims inserted therebetween) to produce the same result.

Referring to Fig. 1 of the drawings, my invention is shown in application to a duplex self-aligning bearing comprising two spaced sets or rows of antifriction elements, such as balls 10—11, running in spaced raceways 12—13 of outer-ring means 14 and in corresponding raceways 15—16 of inner-ring means 17. The outer surface 18 of the outer race means may be of convex and generally spherical shape to provide for self-alignment action in the concave surface 19 of a seat ring 20.

As indicated generally above, the relative axial spacing of race walls (which, for the case of ball bearings shown, may be identified by their centers of curvature in the axial section) in the outer ring with respect to corresponding axial spacing in the inner ring may bear particular predetermined relationships in order to achieve the desired results. These relationships may be realized with solid-ring means 14—17 having in each case both raceways formed therein with the desired axial spacings. However, in the form shown in Figs. 1, I achieve the desired result by employing separate rings 21—22 for the inner ring means 17, there being a gap 23 between rings 21—22 in order to establish the desired relationship and to permit relative axial movement of rings 21—22 for varying magnitudes of unidirectional thrust, in the direction suggested by the opposed heavy arrows 24—25.

Under load, therefore, shaft or axial thrust is transmitted, as by shoulder or nut means (not shown), at location 25 to inner-ring 21; and because of the gap 23, at least for lesser magnitude of thrust, the thrust load is sustained solely through a first path that is limited to the anti-friction elements 10, as along the angular contact or thrust line 26. Thrust is thus transmitted to the outer-ring means 14 and (through the opposite lip of seat 20) to frame or other supporting or reaction means, as suggested at 24. With increasing thrust 24—25, the bearing section comprising balls 10 will be axially deflected; that is, the outer-ring means 14 will move to the left relatively to the inner-ring means 17, or the inner-ring means 17 will move to the right relatively to the outer-ring means 14. According to the invention, when axial deflection has progressed to an extent at which such bearing section becomes loaded substantially to capacity or at least to the desired extent, the gap 23 will have been effectively closed; actually, when mounting the inner-ring means on its support the gap 23 will have closed, but the balls 11 will not sustain load until appreciable axial deflection of row 10 under thrust 24—25 has occurred, so that thrust thereafter is shared both by the described first thrust path and by a new thrust path provided by way of abutting inner-rings 21—22, through the bearing section comprising balls 11 (along contact line 29), and to the outer-ring means 14 and reaction point 24. Once the second bearing section begins to share the thrust load, further increases of thrust fall on the second bearing section at a rate which may exceed the rate of thrust augmentation in the first-loaded bearing section.

The above-described sequence of load sharing may perhaps be better understood from the graphs of Figs. 7, 8, and 9. Fig. 7 depicts the static (non-rotating) situation for high and low contact-angle bearing sections, as in the case of relatively low contact-angle section including balls 10 and the relatively high contact-angle section including the balls 11. With zero thrust, there is zero static deflection, but the higher the contact angle of the bearing section, the less the axial deflection for a given thrust. Fig. 8 shows the same basic relationship for the two types of bearing sections, under dynamic or rotational conditions, at a given relative speed of inner and outer bearing rings, or orbital speed of the balls. Under these conditions, centrifugal force acts on the balls in a direction tending to reduce the instantaneous contact angle on the outer race and to increase the instantaneous contact angle on the inner race, so that, even for the zero-thrust condition, there is an axial deflection, which shows on the graph in each case as a negative deflection, there being greater no-thrust negative deflection the higher the contact angle of the bearing section.

If one neglects outer-ring compression under the wedge action of the right-hand lip of the self-aligning seat 20, and also if one neglects outer-ring local expansion for the other (left-hand) side of the outer ring (occasioned by radial clearance between the outer ring 14 and the seat 20), then one may directly utilize characteristics of the type displayed in Fig. 8 in order to predetermine the above-discussed axial-spacing relationship, for races in the outer-ring means as compared with races in the inner-ring means. This relation may take the form of a lineal distance and may be realized by the gap 23 in the form shown in Fig. 1.

Thus, for a given total thrust at which both bearing sections shall sustain the same thrust component T₀ at a given rotational speed, the individual axial-deflection curves (for such speed) for the high and low-angle bearing sections need only be displaced until crossover is achieved at the stated thrust T₀ (assuming that equality of thrust-sharing is desired, although this may not necessarily be the case). By then observing the curve displacement necessary to effect crossover, as suggested by the legend 30 in Fig. 9, one may have a direct measure of the necessary gap 23 in Fig. 1. This gap may be precisely formed by surface grinding the inner end of one of the rings 21—22 to the desired extent.

It has been indicated in the above discussion with regard to design that, in order to achieve a given thrust-loading sequence or distribution between bearing sections, the wedge action of the seat 20 on the outer bearing ring 14 may, under static or dynamic conditions, compress and thereby change the radial spacing of races in the compressed bearing section. This change will reduce the rate of increase of the bearing-contact angle and thereby alter the axial-deflection curves which would otherwise apply for that bearing section. The above discussion is thus only to be considered generally illustrative; but it will be understood that for the case of self-aligning bearings, relationships similar to those discussed in connection with Figs. 7, 8, and 9 may apply for the bearing sections together with seat 20, in order to predetermine the necessary gap or other means for producing the race-center spacings in the inner and outer rings.

Similarly, with unidirectional thrust, any radial clearance between the outer-ring means 14 and the seat 20 will permit a further axial shift (i. e. axial displacement of the outer ring 14 with respect to the seat 20), and the nature of this clearance will become locally exaggerated, certainly, in the case of the left side of the outer ring 14 shown in Fig. 1. The left side of the outer ring 14 is then radially unsupported, and under increasing thrust-load conditions the outer ring 14 may locally expand, thus increasing the contact angle 26 for this bearing section more rapidly than would otherwise be the case, and thus also changing the axial-deflection characteristic which would otherwise apply for the left-hand bearing section. This change or increase in the angle of contact line 26 becomes more desirable when the left bearing section is already under a substantial thrust load. By providing the left-hand bearing section 26 with a relatively low contact angle as suggested, one obtains the further advantage of accurately radially locating a heavy rotor or other means supported on a shaft carried by inner-ring means 17, particularly for the high speeds of rotation encountered in jet engines, even under no-load or light-load conditions.

Because the thrust loads which the bearing of Fig. 1 is called upon to sustain are always predominantly in the same direction, each of the bearing-ring means 14—17 may be said to have an extreme end which is never loaded. Thus, for the assumed direction of thrust in the bearing of Fig. 1, the left end of the outer-ring means 14 (at least leftward of the point of contact for the left bearing section 10) is never subjected to load; neither is the right-most end of the inner bearing-ring means 17. Because of this fact the inner and outer rings both lend themselves particularly to fabrication in separate parts, with race division between parts always preferably at some point on the unloaded side of the point of contact for the antifriction elements in the bearing section under consideration. With two or more piece construction for one of the rings, it is, of course, possible to employ a greater-than-usual number of antifriction elements in the bearing section, resulting in improved load capacity for the bearing as a whole. In Fig. 1, I show that the inner-ring means 17 may involve a split of the inner ring for the right-hand bearing section, thus providing an additional inner ring 28 defining part of the race 16; as indicated, the part of race 16 included in ring 28 is preferably on the unloaded side of the contact line 29 for that particular bearing section.

As suggested in the discussion of the arrangement of Fig. 1, various other means may be employed to assure the desired race-center spacings on the inner and outer rings in order to achieve a given sharing of thrust load. In Figs. 2 and 3, I show two further means for obtaining substantially the same result as in Fig. 1, and, therefore, corresponding parts have been identified with the same reference numerals as in Fig. 1. In Fig. 2, no deliberate gap is relied upon to achieve the desired race-spacing relationship. The inner ring means 17 may thus be continuous at least between the contact points in the respective raceways 15—16; and, if desired, a separate removable unloaded ring section (as at 28 in Fig. 1) may be employed for the unloaded part (right end) of the inner-ring means 17, in order to utilize a greater-than-usual number of antifriction elements 11 in one of the bearing sections. However, in the form shown, the inner-ring means 17 is a solid ring extending the full length of the assembled bearing, as is frequently the practice in duplex self-aligning bearing configurations.

The desired relation between race-center spacings in the outer and inner rings 14—17 may also be achieved by employing a solid outer ring of the type shown in Fig. 1 in conjunction with the solid inner ring 17 of the type shown in Fig. 2, the race centers being, of course, appropriately spaced in a precision-grinding operation; however, this type of construction may require expensive production operations. For a less expensive achievement of the same ends, I illustrate the employment of separate rings 33—34 as the outer rings of Fig. 2. Depending upon the location of the race centers in the rings 33—34 with respect to the adjacent (axially inner) ends of these rings, grinding or deliberate spacing of these ends may be involved in establishing the desired sharing of thrust loads; in the form shown, I illustrate the employment of simple interference means, such as one or more shims 35, sandwiched between the adjacent ends of the rings 33—34, to achieve the desired spacing.

In Fig. 3, I illustrate a still further alternative arrangement wherein separate rings 33—34 provide the outer-ring means 14, and separate rings 21—22' provide the inner-ring means. Again, depending upon the location of race centers in each of these rings with respect to the inner ends of these rings, various measures may have to be adopted to assure the desired race-center spacing in the inner and outer-ring means. Shim means of the type shown at 35 in Fig. 2 may be necessary between outer rings 33—34, but for the case illustrated in Fig. 3, the gap 23 has been proportioned to achieve the desired ends.

The above discussion has been limited to self-aligning duplex bearings, with the possible implication that principles of the invention may be limited to multiple-row bearings having two rows. However, in Fig. 4, I illustrate application of the invention to a bearing configuration having more than two rows and wherein more than two rows sustain thrusts and progressively share the thrust in predominantly a single direction. The bearing of Fig. 4 may comprise a single outer-ring means 40 having a self-aligning fit within a seat 41 and may be finished with a plurality of raceways 42—43—44—45, for a plurality of sets of antifriction elements 46—47—48—49. To facilitate assembly, I illustrate separate inner rings 50—51—52—53 for the various bearing sections. In the form shown, the first three sections, comprising elements 46—47—48, have contact angles inclined in the same direction so as to sustain a predominantly unidirectional thrust, suggested by arrows 54—55. The contact angle for the left-most bearing section may be relatively low while those for the other bearing sections (taking the same direction of thrust) may be progressively higher; and gaps 56—57 between the rings 50—51—52, respectively, may provide the desired allowance for axial deflection to produce a given progressive sharing of the thrust load, and, for the case of elements 46, a transfer from predominantly radial to predominantly thrust load-sustaining characteristics. In spite of the fact that the load may be predominantly in the direction indicated, there may be occasions, as in the case of a flying turbo-jet rotor when, for one reason or another, the thrust load may become reversed. The reversed thrust load may peak only temporarily, and a single bearing section in addition to the described bearing sections may best take the shock. In Fig. 4, the right-most bearing section, including elements 49, is provided for this purpose, as suggested by the contact line 58, inclined opposite to the other contact lines.

It has been briefly intimated that the principles of my invention are not limited to self-aligning bearings, and to illustrate the point, I show in Fig. 5 a more or less conventional tandem bearing incorporating race-spacing or inclined-wall-spacing teachings of the invention. The form of Fig. 5 is shown to comprise two completely separate bearing assemblies to be subjected to a predominantly unidirectional thrust, as suggested at 60—61. The left bearing may have a relatively low contact angle as suggested by the line 62, and the bearing at the right may have a relatively high contact angle as suggested at 63. Depending upon the location of race centers in the various inner and outer rings with respect to the ends of such rings, interference or shim means may be necessary between the outer rings 64—65 to achieve the desired thrust sharing, but in the form shown one or both of the adjacent faces of the inner rings may be ground off to produce the gap 66, analogous to the gap 23 in Fig. 1. Because the configuration of Fig. 5 is not likely to be subjected to race compression and expansion of the kind which applies for the self-aligning bearings, the discussion in connection with Figs. 7, 8, and 9 may be more readily applicable to Fig. 5, in the matter of specifying the size of the gap 66 for a given load and speed relationship. It will be understood that, although Fig. 5 illustrates but two bearing sections, the teaching of Fig. 4 may be directly applicable to the arrangement of Fig. 5 for any number of bearing sections, so that merely by adding another bearing section, with the necessary gap or interference to allow for axial deflection, one may progressively load all bearing sections to substantially a desired limiting load without overloading any one section.

In all the arrangements thus far discussed, the low contact-angle bearing sections have been nearest the location of unidirectional thrust on the inner bearing ring, and the high contact-angle bearing sections have been nearer the location of thrust on the outer bearing-ring means. To illustrate that this is not a limiting illustration of the principles of my invention, I show, in Fig. 6, an arrangement which may employ precisely the same bearings as those discussed in Fig. 5 and, therefore, similar reference numerals have been used. In Fig. 6, however, location of the high and low contact-angle bearings has been reversed so that the low contact angle 62 is adjacent to the point of thrust application to the outer bearing ring, while the high contact angle 63 is adjacent to the point of thrust application to the inner bearing ring. Here again, end surfaces of the bearing rings may be ground off to produce the desired race spacing, but I have shown provision of an interference or shim means 68 between the inner bearing ring means 69—70, so as to define a gap 66' of desired extent between the outer bearing rings 64—65. It will be seen that, as in the case of the other discussed forms, the arrangement of Fig. 6 provides for the radial support of the load predominantly by the low contact-angle bearing section until such time as the unidirectional thrust shall have taken up the gap 66' through axial deflection of rings 64—(69—70) with respect to each other. Thereafter, both bearing sections will share the load, and by proper initial design of the contact angles, knowing the axial-deflection characteristics for these bearing sections, the design-maximum thrust load on the bearing may be caused to load all bearing elements equally or in the desired sharing relationship.

The above discussion of the forms shown has been concerned with definition of axial spacings of races, race-curvature centers, and so forth, depending on the aspect from which the invention is viewed. It may perhaps be inferred from this discussion that I prefer greater minimum axial spacing between race-curvature centers in the outer-ring means than in the inner-ring means (in the case of Figs. 1 to 5) or greater minimum axial spacing between race-curvature cenetrs in the inner-ring means than in the outer-ring means (in the case of Fig. 6). Actually, however, this is not the case, because the basic criterion is that the axial-deflection characteristics of two or more rows shall be different and that the row with the greater deflection characteristic shall be axially deflected before substantial deflection of the row with the lesser deflection characteristic. In Fig. 10, I illustrate certain aspects of this criterion on an enlarged scale.

In Fig. 10, the row 10 having the low contact angle (greater axial-deflection characteristic) is shown in exaggerated relation with the row 11 having the high contact angle (lesser axial-deflection characteristic). Race-curvature centers are identified by primes applied to the reference numbers for the races they determine. Solid inner and outer-ring means 17—14 are shown in order to simplify interpretation of minimum axial spacings $x_i$ and $x_o$ between inner and outer race-curvature centers, respectively. Radial clearances and race curvatures in rows 10—11 may be assumed to be such as to establish initial contact angles 26—29.

If now, contacts were to be established simultaneously in both rows 10—11, for progressively applied thrust, the row 10 tends to sustain substantially the full radial component of the load, while row 11 sustains substantially the full thrust component; under these circumstances, the minimum axial spacing $x_i$ would exceed the minimum axial spacing $x_o$, by an amount $\Delta$. If, on the other hand, contact angles and race-curvature radii remaining as shown, the spacings $x_i$ and $x_o$ are equal, or if spacing $x_o$ exceeds spacing $x_i$, a slack or deflection of row 10 must be taken up at least to the extent $\Delta$ before row 11 begins to share a significant part of the thrust load. Also, by the same token, for cases in which the minimum race-curvature center spacing $x_i$ exceeds spacing $x_o$ by an amount less than $\Delta$, deflection of row 10 will be necessary before row 11 assumes its share of the radial load. In either of these latter situations, both rows 10—11 may be caused to share the thrust load in a desired relationship, depending upon the respective capacities (e. g. number of balls per row) of rows 10—11, as will be understood.

The above discussion of race-center spacings $x_i$ and $x_o$ is intended only to illustrate the fact that the teachings of this invention are not limited to having the race-center spacing on a particular one ring exceed that on the other ring. For purposes of simplified illustration, the race curvatures in Fig. 10 were all equal, but neither is this a necessary condition for operation of the invention. Actually, the same contact-line relationship 26—29 may apply in the bearing of Fig. 10 for the situation in which, for example, the radius of race 12 is sufficiently larger than the other race-curvature radii that the spacing $x_o$ equals or exceeds the spacing $x_i$. This would tend to emphasize the more important criterion for practice of the invention, as follows: when two adajcent ball rows (which may have different contact angles when the end play of each is taken up in the thrust direction) are paired together, they shall be so paired that, for progressively increasing unidirectionally applied thrust, the row having the greater contact angle is withdrawn from contact (or has not yet attained contact) at the instant when the row with the lesser contact angle has just attained contact.

It will be seen that I have described a relatively simple means for assuring that in a multiple-row bearing no one row, section, or stage of bearing support will be overloaded when the total load on the assembled bearing exceeds the capacity of any one row. My invention provides a means for efficiently supporting a load at all times and until all antifriction elements have been loaded to their individual capacities. In particular application to the rotors of turbo-jet engines, wherein a wide range of thrust loads is to be accommodated at high-rotational speeds, my bearing configurations have immeasurably prolonged engine life and have substantially eliminated bearings as source of engine failure.

While I have described the invention in detail for the preferred forms shown, it will be understood that modifications may be made within the scope of the invention as defined in the claims which follow.

I claim:

1. In a bearing, outer-ring means, inner-ring means, a plurality of corresponding races in each of said ring means and antifriction elements in corresponding races of both said ring means, the walls of one pair of corresponding races being inclined to sustain a predominantly unidirectional combined axial and radial load, the walls of a second pair of corresponding races being similarly inclined to sustain thrust in the same axial direction, whereby the bearing sections comprising said first and second pairs may be said to have first and second characteristic contact angles, one of said contact angles being greater than the other so that the bearing section with the lesser conact angle may have a greater axial-deflection characteristic than the bearing section with the greater contact angle, and axially rigid means spacing the races of one of said ring means axially with respect to the races of the other said ring means by an amount permitting a predetermined excess of axial deflection of said low contact-angle bearing section over the axial deflection of said high contact-angle bearing section for a given unidirectional thrust load on said bearing.

2. In a self-aligning bearing, a seat ring having an inwardly facing concave generally spherical seat, outer-ring means including an outer convex surface seated in said seat, inner-ring means, a plurality of corresponding races in each of said ring means and antifriction elements in the corresponding races of both said ring means, the walls of one pair of corresponding races being inclined to sustain a predominantly unidirectional combined axial and radial load, the walls of a second pair of corresponding races being similarly inclined to sustain thrusts in the same axial direction, whereby the bearing sections comprising said first and second pairs may be said to have first and second characteristic contact angles, and axially rigid means spacing the races of one of said ring means axially with respect to the races of the other of said ring means by an amount permitting a predetermined excess of axial deflection of one bearing section over the axial deflection of the other bearing section.

3. In a self-aligning bearing, a seat ring having an inwardly facing concave generally spherical seat, outer-ring means including an outer convex surface seated in said seat, inner-ring means, a plurality of corresponding races in each of said ring means and antifriction elements in the corresponding races of both said ring means, the walls of one pair of corresponding races being inclined to sustain a predominantly unidirectional combined axial and radial load, the walls of a second pair of corresponding races being similarly inclined to sustain thrust in the same direction, whereby the bearing sections comprising said first and second pairs may be said to have first and second characteristic contact angles, one of said contact angles being greater than the other so that the bearing section with the lesser contact angle may have a greater axial-deflection characteristic than the bearing section with the greater contact angle, the bearing section with the greater contact angle being on that side of said seat against which the thrust load of said seat is sustained, whereby with increasing thrust and resulting inward deformation of said outer-ring means near the high contact-angle section, said high-contact angle may be reduced to share a greater component of the total radial and axial load under high-load conditions.

4. In a self-aligning bearing, a seat ring having an inwardly facing concave generally spherical seat, outer-ring means, a plurality of corresponding races in each of said ring means and antifriction elements in the corresponding races of both said ring means, the walls of one pair of corresponding races being inclined to sustain a predominantly unidirectional combined axial and radial load, the walls of a second pair of corresponding races being similarly inclined to sustain thrust in the same direction, whereby the bearing sections comprising said first and second pairs may be said to have first and second characteristic contact angles, one of said contact angles being greater than the other so that the bearing section with the lesser contact angle may have a greater axial-deflection characteristic than the bearing section with the greater contact angle, the bearing section with the greater contact angle being on that side of said seat against which the thrust load of said seat is sustained, whereby, under elevated thrust-load conditions in said predominant direction of thrust there may be developed a radial clearance between said outer-ring means and said seat at least in the central portion thereof, further whereby under said elevated thrust-load conditions in said predominant direction of thrust the said low contact-angle bearing section may be characterized by outward deformation of said outer-ring means with resultant increase on the contact angle thereof so that the load sustained by said low contact-angle bearing section may be more predominantly a thrust load.

5. In a duplex antifriction bearing, outer-ring means, inner-ring means, a plurality of corresponding ball races in each of said ring means, and bearing balls in the corresponding races of both said ring means, the race curvatures and relative radial and axial positions of race-curvature centers for one pair of corresponding races being so related to the diameters of balls running therein as to sustain a predominantly unidirectional combined radial and axial load in the bearing section formed thereby, the race curvatures and relative radial and axial positions of race-curvature centers for another pair of corresponding races being so related to the diameters of balls running therein as to sustain a predominantly unidirectional thrust in the same direction, whereby said bearing sections may be said to have first and second characteristic contact angles, one of said contact angles being greater than the other so that the bearing section with the lesser contact angle may have a greater axial-deflection characteristic than the bearing section with the greater contact angle, axially rigid means spacing the races of one of said ring means, there being a gap between races of the other of said ring means for free relative axial movement thereof, said gap being related to the relative axial spacing of race-curvature centers in said outer-ring means with respect to said inner-ring means to an extent permitting a predetermined excess of axial deflection of said low-contact bearing section over the axial deflection of said high-contact bearing section for a given unidirectional thrust load in said direction.

6. A bearing according to claim 5, in which said ring means having said axially rigid spacing means is a solid single ring with two axially spaced races therein.

7. A bearing according to claim 5, in which said ring means having said axially rigid spacing means comprises two separate rings in axial abutment with each other.

8. In a multiple-row antifriction bearing, outer-ring means, inner-ring means, a plurality of corresponding ball races in each of said ring means, and bearing balls in the corresponding races of both said ring means, the race curvatures and relative radial and axial positions of race-curvature centers for one pair of corresponding races being so related to the diameters of balls running therein as to sustain a predominantly unidirectional combined radial and axial load in the bearing section formed thereby, the race curvatures and relative radial and axial positions of race-curvature centers for the other pair of corresponding races being so related to the diameters of balls running therein as to sustain a predominantly unidirectional thrust in the same direction, whereby said bearing sections may be said to have first and second characteristic contact angles, one of said contact angles being greater than the other so that the bearing section with the lesser contact angle may have a greater axial-deflection characteristic than the bearing section with the greater contact angle, axially rigid means spacing the races of one of said ring means, one of said ring means comprising separate rings with separate of said races therein, interference means between said separate rings and in axially abutting relation with both said separate rings for abnormally spacing said separate rings and therefore the races on said separate rings axially with respect to the axial spacing of corresponding races on the other of said ring means, the axial extent of said interference means being related to the relative axial spacings of race-curvature centers in said ring means to an extent permitting a predetermined excess of axial deflection of said low contact-angle bearing section over the axial deflection of said high contact-angle bearing section for a given unidirectional thrust load in said direction.

9. A bearing according to claim 8, in which said ring means not having said interference means is a solid ring embracing both said races thereof.

10. A bearing according to claim 8, in which said ring means not having said interference means comprises separate rings separately formed with said races thereof.

11. In a multiple-row antifriction bearing, outer-ring means, inner-ring means, a plurality of corresponding ball races in each of said ring means, and bearing balls in the corresponding races of both said ring means, the race curvatures and relative radial and axial positions of race-curvature centers for each pair of corresponding races being so related to the diameters of balls running therein as to sustain predominantly unidirectional thrusts in the same direction, whereby said bearing sections may be said to have first and second characteristic contact angles, one of said contact angles being greater than the other so that the bearing section with the lesser contact angle may have a greater axial-deflection characteristic than the bearing section with the greater contact angle; whereby, for said predominant direction of thrust, opposite characteristic ends of each of said ring means may be said to serve no thrust function, one of said ring means being formed with a separate ring for said characteristic end, said separate ring including substantially one-half the race at said characteristic end, whereby a relatively large number of balls may be accommodated in the raceways of the bearing section at said one characteristic end.

12. In a multiple-row antifriction bearing, two adjacent bearing sections, each including inner and outer rings having ball raceways and balls therein, the walls of said raceways being inclined to sustain at least a unidirectional axial load, whereby said load may be considered applied essentially to a first thrust-application ring which is the outer ring of one of said bearing sections and to a second thrust-application ring which is the inner ring of the other bearing section, and whereby said bearing sections may be said to have similarly inclined first and second characteristic contact angles, one of said contact angles being greater than the other so that the bearing section with the lesser contact angle may have a greater axial-deflection characteristic than the bearing section with the greater contact angle, the thrust-application ring of said low contact-angle bearing section being relatively in non-deflecting axial thrust-sustaining relation with the axially adjacent ring of said other bearing section, and there being a gap between the other adjacent rings of said bearing sections.

13. A bearing according to claim 12, in which a shim rigidly spaces said first-mentioned adjacent rings in order to define the gap between said second-mentioned adjacent rings.

14. A bearing according to claim 12, in which said first-mentioned adjacent rings are the inner rings of said bearing sections.

15. A bearing according to claim 12, in which said first-mentioned adjacent rings are the outer rings of said bearing sections.

16. In a multiple-row antifriction bearing, outer-ring means, inner-ring means, a plurality of corresponding ball races and bearing balls in the corresponding races of both said ring means, the race curvatures and relative radial and axial positions of race centers of three pairs of corresponding races being so related to the diameter of balls running therein as to sustain predominantly unidirectional thrust loads in the same direction in the three bearing sections formed thereby, axially rigid means spacing the races of one of said ring means, there being gaps between the races of the other of said ring means for relatively free relative axial movement thereof, for the purpose described.

17. In a multiple-row antifriction bearing, outer-ring means, inner-ring means, a plurality of corresponding ball races and bearing balls in the corresponding races of both said ring means, the race curvatures and relative radial and axial positions of race centers of two pairs of corresponding races being so related to the diameter of balls running therein as to sustain predominantly unidirectional thrust loads in the same direction in the two bearing sections formed thereby, the race curvatures and relative radial and axial positions of race centers of a third pair of corresponding races being so related to the diameter of balls running therein as to sustain a predominantly unidirectional thrust load in the opposite direction, axially rigid means spacing the races of one of said ring means, there being gaps between the races of the other of said ring means for relatively free relative axial movement thereof, for the purpose described.

18. In a bearing, outer-ring means, inner-ring means, a plurality of corresponding races in each of said ring means and antifriction elements in corresponding races of both said ring means, the walls of one pair of corresponding races being inclined to sustain a predominantly unidirectional combined axial and radial load, the walls of a second pair of corresponding races being similarly inclined to sustain thrust in the same axial direction, whereby the bearing sections comprising said first and second pairs may be said to have first and second axial-deflection characteristics, one of said deflection characteristics being greater than the other, and axially rigid means spacing the races of one of said ring means axially with respect to the races of the other of said ring means by an amount permitting a predetermined excess of axial deflection of said one bearing section over the axial deflection of said other bearing section for a given unidirectional thrust load on said bearing.

19. In a bearing, outer-ring means, inner-ring means, a plurality of corresponding races in each of said ring means and antifriction elements in the corresponding races of both said ring means, the walls of one pair of corresponding races being inclined to sustain a predominantly unidirectional combined axial and radial load, the walls of a second pair of corresponding races being similarly inclined to sustain thrusts in the same axial direction, whereby the bearing sections comprising said first and second pairs may be said to have first and second characteristic contact angles, and axially rigid means spacing the races of one of said ring means axially with respect to the races of the other of said ring means by an amount permitting a predetermined excess of axial deflection of one bearing section over the axial deflection of the other bearing section.

20. In a bearing, outer-ring means, inner-ring means, a plurality of corresponding races defining bearing sections in each of said ring means and antifriction elements in the corresponding races of both said ring means, the radial clearance of one of said sections exceeding that of a second of said sections, whereby said bearing sections may have different axial-deflection characteristics, and axially rigid means spacing the races of one of said ring means axially with respect to the races of the other of said ring means by an amount permitting a predetermined excess of axial deflection of the bearing section with the greater characteristic over the axial deflection of the bearing section with the lesser characteristic for a given unidirectional thrust load on said bearing.

21. In a multiple-row antifriction bearing, inner-ring means, outer-ring means, a plurality of corresponding ball races in each of said rings, and bearing balls in the corresponding races of both said ring means, the radial clearance and the race curvature for each pair of corresponding races being so related to the axial spacing of said curvatures as to cause each said pair to sustain predominantly unidirectional thrusts in the same direction and at the same time to exhibit different axial-deflection characteristics, and axially rigid means spacing the races of one of said ring means axially with respect to the races of the other of said ring means by an amount permitting a predetermined excess of axial deflection of the pair with the greater characteristic over the axial deflection of the pair with the lesser characteristic for a given unidirectional thrust load on said bearing.

22. In a multiple-row antifriction bearing, outer-ring means, inner-ring means, a plurality of corresponding ball races and bearing balls in the corresponding races of both said ring means, the radial clearances in three rows of said bearing being such as to provide at least one row with an axial-deflection characteristic exceeding that of another row, means axially rigidly spacing the races of one of said ring means, the inherent minimum axial spacing between races of the other of said ring means being such that for a unidirectionally applied thrust the row with the greatest axial-deflection characteristic will take up thrust before substantial thrust will be sustained by a pair with a lesser axial-deflection characteristic.

References Cited in the file of this patent

UNITED STATES PATENTS

| 1,145,018 | Hess | July 6, 1915 |
| 1,452,603 | Himes | Apr. 24, 1923 |
| 1,645,345 | Okner | Oct. 11, 1927 |
| 2,103,912 | Montgomery | Dec. 28, 1937 |
| 2,440,444 | Huber | Apr. 27, 1948 |
| 2,511,675 | Monpain | June 13, 1950 |

FOREIGN PATENTS

| 302,790 | Italy | Nov. 8, 1932 |